March 19, 1935.　　　W. H. FRANK　　　1,994,509
DISTRIBUTION PANELBOARD
Filed Aug. 24, 1933　　　3 Sheets-Sheet 1

INVENTOR.
William H. Frank
BY
Daniel G. Cullen
ATTORNEY.

March 19, 1935.  W. H. FRANK  1,994,509
DISTRIBUTION PANELBOARD
Filed Aug. 24, 1933   3 Sheets-Sheet 2

INVENTOR.
William H. Frank
BY
Daniel G. Cullen
ATTORNEY.

March 19, 1935. W. H. FRANK 1,994,509
DISTRIBUTION PANELBOARD
Filed Aug. 24, 1933 3 Sheets-Sheet 3
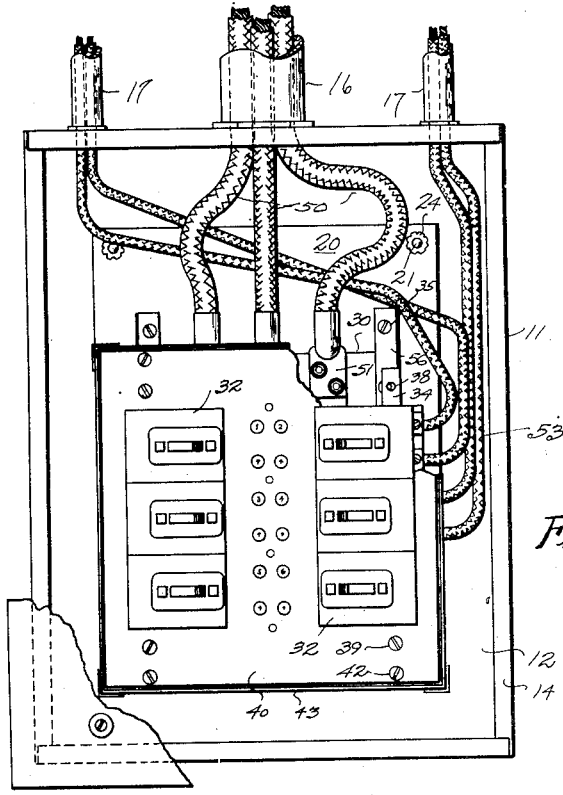
INVENTOR.
William H. Frank
BY
ATTORNEY.

Patented Mar. 19, 1935

1,994,509

UNITED STATES PATENT OFFICE 1,994,509

DISTRIBUTION PANELBOARD

William H. Frank, Detroit, Mich., assignor to Bulldog Electric Products Company, Detroit, Mich., a corporation of West Virginia Application August 24, 1933, Serial No. 686,487

14 Claims. (Cl. 247—19)

This invention relates to distribution panelboards and more particularly to details of construction of the same.

Distribution panelboards of the type under consideration generally include a sheet metal box containing a panel mounting plate, a panel built up of circuit protective devices or the like, a door and trim or front plate, and a panel housing, which completes the barrier between the panel and the front plate. If the panelboard is to be surface mounted, generally the box is mounted after the building wall upon which it is to be mounted is formed or poured, and consequently, there is little difficulty in effecting a properly levelled and properly located mounting for the panelboard. However, if the panelboard is to be flush mounted, generally there is presented a considerable amount of difficulty in obtaining the necessarily accurate levelling and alignment of the panelboard parts with respect to the wall in which the panelboard is to be disposed.

To aid in an understanding of these difficulties, the usual method of flush-mounting a panelboard will be described. Before the building walls are constructed, the sheet metal boxes or cabinets are mounted in their desired locations. Because of the fact that these boxes will be shifted somewhat, while the walls are hardening and settling, and because the completed finished wall will not, in all probability, be exact in thickness and location, these boxes are generally found to be askew or not level, and out of the exactly proper locations with respect to the front surfaces of the walls. Therefore, it is the practice to provide adjustable connection means between the backs of the boxes and the panel mounting which permits these panels to be moved with respect to the immovably mounted boxes so that the panels will be properly levelled and properly laterally adjusted or located with respect to the finished wall surfaces, even though the boxes are somewhat askew, or out of proper lateral adjustment. After the panels are properly levelled, and properly located in their boxes, the panel housings and the door and trim or the front plates are mounted, and the mountings for these parts are such that these parts are easily properly levelled and adjusted. However, inasmuch as the panel housings generally are secured with respect to their panels in such a manner that they are not adjustable with respect thereto, or generally are secured to the front plates so that they are not adjustable with respect thereto, the final adjustment of the panelboard parts, to take up the space between the panel and the front plate, in the event that the lateral adjustment of the panel is not exactly proper with respect to the front surface of the associated wall, and to level the front plate in the event it is not exactly level, can be effected only through the medium of the adjustable connection between the panel mounting and the back of the box, and this proves to be the only means that may be utilized as a final adjustment for this purpose. Since this final adjustment is generally made after the panel is installed and the cables connected thereto are in place, which cables overlie the adjustable bolts of the mounting plate, the final adjustment of the panel position with respect to the wall proves to be an annoying task. Part of the annoyance is due to the inaccessibility of these bolts and part is due to the fact that it is very difficult to accomplish this adjustment except by a cut and try method involving repeated mounting and dismounting the front plate.

Accordingly, it is a principal object of the present invention to provide a construction wherein the last mentioned final adjustment can be made by utilizing readily accessible means, independent of the mounting plate bolts, and operable through the door opening in the front plate after the front plate is mounted, the means being such as not to require non-rigid mountings for the panel, and thereby permitting the panel to be rigidly mounted, before the cables are connected thereto, and not thereafter disturbed, even during the final adjustment of the panel housing and front plate.

In the preferred embodiment of the invention, the panel housing that covers the space between the panel and the front plate, is made in two parts, one of which is in the nature of a housing plate fixedly and non-adjustably secured with respect to the panel, and the other of which is in the nature of a housing frame adjustably secured with respect to the housing plate and the panel and therefore capable of lateral adjustment, after the panel is completely installed, to take up the space between the panel and the front plate. The housing is independent of the front plate, and since it is telescopically constructed, it will not restrain required movement of the front plate for proper position, and will permit the door opening of the front plate to be somewhat asymmetrically positioned with respect to the panel or housing.

By making the panel housing of two parts, one of which is adjustable with respect to the other, there is provided a final adjustment means which makes it unnecessary for the electrician to go to the panel mounting bolts in order to have the parts finally and properly located. Since the panel housing bolts are more readily accessible and manipulable than the panel mounting bolts, being accessible through the door opening, such final adjustment means provides an easy method of completing the final and accurate adjusted mounting of the panel and its associated parts, and permits this adjustment to be made after the front plate has been properly positioned and mounted.

A further object of this invention is a novel detail of manufacture of distribution panels. Distribution panels of the class under consideration generally include a mounting plate having holes through which pass bolts connecting the mounting plate to the back of the box. When the installation is of the surface type there is no necessity for providing a levelling adjustment between the mounting plate and the box, and therefore the holes through which the mounting holes pass may well be only enough larger than the diameter of the bolts to permit these to have clear passage through the holes.

However, when the mounting is of the flush type, it becomes necessary to provide a levelling adjustment and accordingly it is the practice to provide large holes in the mounting plate through which holes pass the mounting bolts, large flat nuts on the bolts, on both sides of the plate, locking the plate to the bolts. Since mounting plates and the associated parts of panels are made in factories, and it is not known at the time of manufacture whether the panel is to be flush mounted or surface mounted, it has generally been the practice to provide all mounting plates with large holes, since the presence of these holes would permit levelling adjustment for flush mountings and would not interfere with the mounting in the event the panel was installed on a surface.

However, this practice is considered objectionable because these large holes, not utilized on surface mountings, permit more play or shifting of the mounting plate than is desired, and by the present invention it is proposed to construct the mounting plate in such a fashion that this objection will be obviated. It is proposed to have the mounting plate provided with two or more concentric knock-out scorings centered at the location desired for each of these holes, to permit the proper size hole to be knocked out, the smaller knockout being used for surface mountings, where a small hole is desired, and the larger knockout being used for flush mountings, where a large hole is desired.

In some cases, it is preferred to have holes punched, for mounting holes, and to provide one or more knock-out scorings around each of these holes, to permit the holes to be enlarged by knocking out the scoring. The portion that is knocked out may well be regarded as an integral bushing which may be removed without difficulty to transform the hole from a small diameter surface type hole to a large diameter flush type hole.

A still further object is another novel detail of manufacture, providing novel circuit legend indicating arrangements and parts.

By the present invention it is proposed to provide the panel housing plate with apertures or windows through which are exposed suitable legend markings or indicia corresponding to and indicating the circuit arrangements of the panel, the markings being on a card disposed in back of the housing plate. It is proposed to provide uniformly positioned apertures on the housing plate, to form the windows, and to provide uniformly printed card strips which may be utilized, without material alteration, regardless of the circuit connections of the panel. For example, the same strip may be used on a panel, whether the same be connected up for single pole breakers, double pole breakers, or three pole breakers, the position of the strip being varied as conditions require to provide different circuit indications.

It is further proposed to use this strip as an insulating barrier or shield for the housing plate and for closing the apertures or windows in the housing plate. In panels of the type being considered, an arc chute is formed under the row of housing plate windows, by virtue of the fact that the circuit protective devices or breakers utilized on these panels have arc vents which discharge into a central chute which happens to be immediately under and in line with the housing plate windows. The provision of the card or strip under these windows provides a means to prevent arcs in this chute from arcing to the metal housing plate in front of the panel.

Still further objects of the invention of this application will be readily apparent to those well skilled in the art upon reference to the appended drawings showing embodiments of these inventions. In these drawings, Fig. 1 is a partially cut away front view of a flush mounted panelboard;

Figure 1:
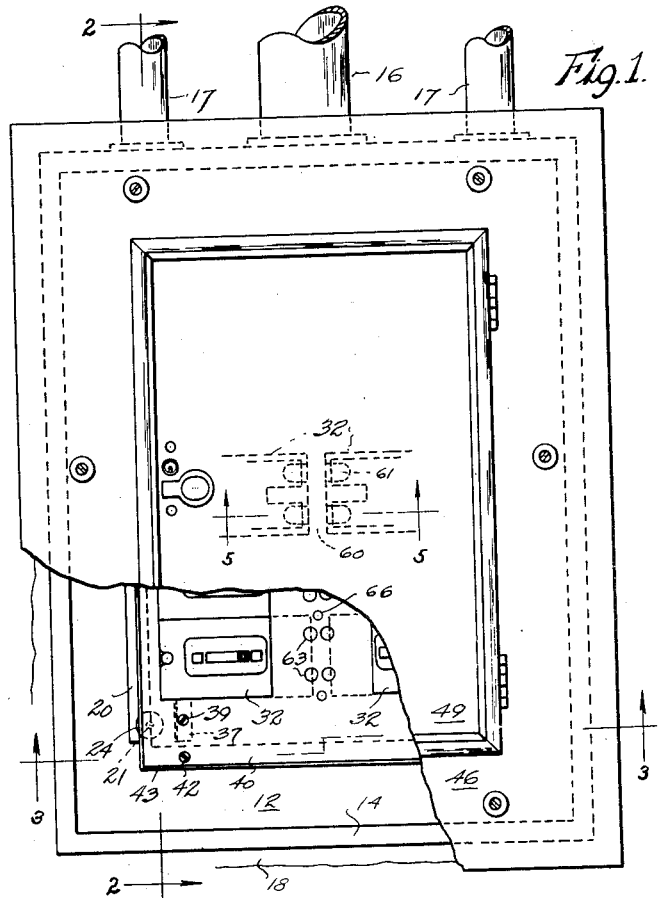
Figure 2:
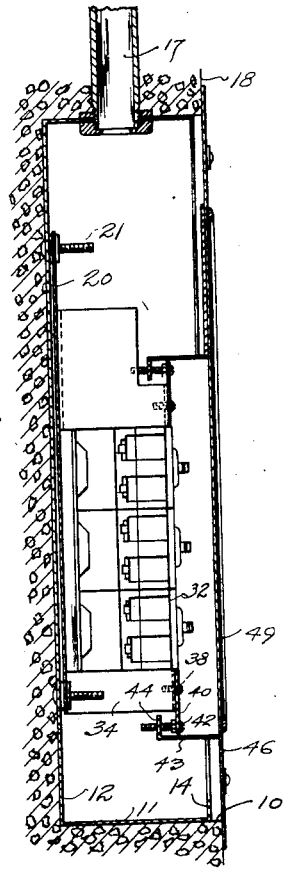
Fig. 2 is a side section thereof, as if on line 2—2 of Fig. 1.
Figure 3:
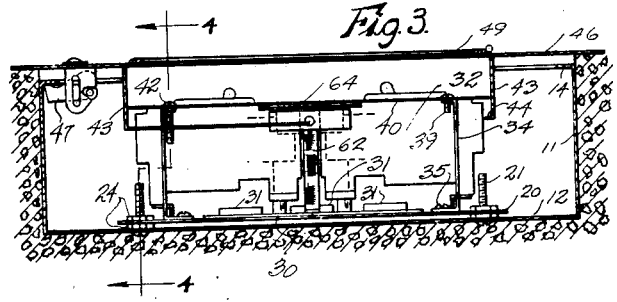
Fig. 3 is an end section thereof, as if on line 3—3 of Fig. 1.
Figure 3A:
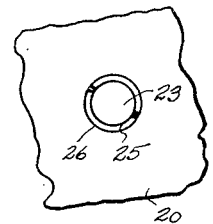
Fig. 3a shows a detail.
Figure 12:
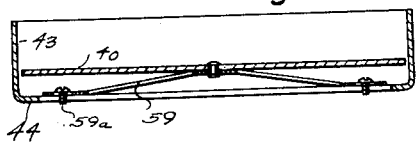
Figure 6:
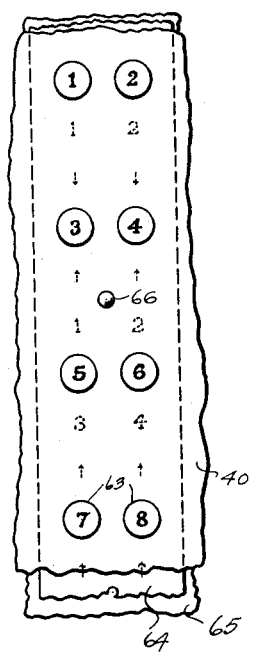
Fig. 6 shows an arrangement of windows in the housing plate and a circuit indicating card whose numbers are exposed through these windows.
Figure 7A:
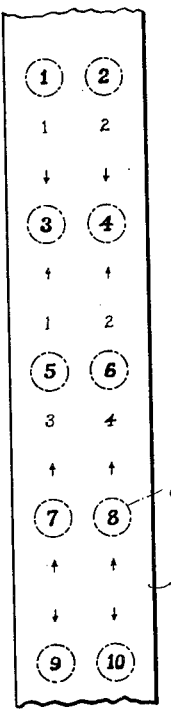
Figure 7B:
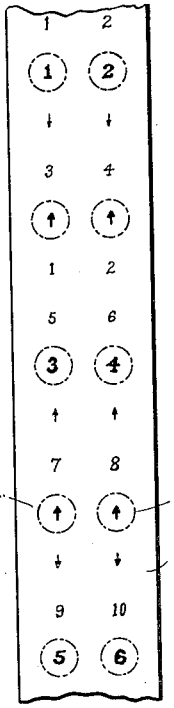
Figure 7C:
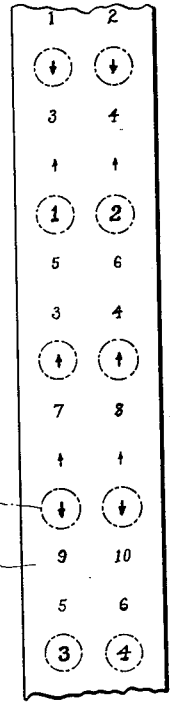

Figs. 7a, 7b, and 7c show the card of Fig. 6 in three positions with respect to the windows in the plate, corresponding respectively to single pole breaker panels, double pole breaker panels, and three pole breaker panels;

Fig. 8 is a front view of the panelboard, with the trim plate cut away, except at a corner thereof, and with the housing plate and housing frame cut away at an opposite corner;

Fig. 9 is a perspective view of a sheet metal part forming a housing plate leg and a cable guard plate;

Fig. 10 is a view in section showing the relation between parts of the panelboard;

Figs. 11 and 12 show alternative methods of connecting the housing plate and the housing frame.

Referring to the drawings, wherein like reference numerals refer to like parts, it will be seen that there is shown a flush mounted panel board disposed in a recess 10 of a building or column wall and including a sheet metal cabinet or box 11 having a back 12 and a front flange 14. As is the common practice, the box 12 is disposed in place before the wall is poured or otherwise formed and is supported by means of forms or supports (not here shown) and also by means of the conduits 16, 17, leading thereto, the conduit 16 in this case being a main cable conduit and the conduits 17 being side branch cable conduits. Because of the impossibility of accurately predetermining the final position of the box with respect to the front of the finished wall, and also because of the movement of the box during the natural settling and hardening of the walls, it is found, as expected, that the box is not properly levelled and properly laterally adjusted with respect to the front surface 18 of the wall. Therefore, the panel mounting plate 20, which is disposed near the back 12 of the box 11, is mounted therein on screw studs 21 which are threaded into tapped holes in the back of the box and set in the box before the wall is formed and which are held in place in the box back 12 by the interengaging threads and by virtue of their being welded or otherwise secured to the box back. The mounting plate bolts 21 pass through holes 23 in the mounting plate, and the mounting plate is held securely with respect to the box back by these bolts and by their large flat nuts 24 disposed on opposite sides of the mounting plate 20.
The holes 23 in the mounting plate, through which pass the bolts 21, in the preferred embodiment, are knocked out of knockout scorings 25 only enough larger than the bolts 21 to permit these to pass clearly through the holes 23. These scorings are surrounded by larger diameter scorings 26 which provide larger knock-outs to permit the provision of larger holes for the bolts 21.

If desired, the holes 23 may be provided before the plate 20 leaves the factory, in which case the knockout 26 permits enlargement of the same. If the panel mounting plate is to be used on a surface installation, the knock-outs inside the scorings 26 are not removed, and consequently there is very little play between the mounting plate and the bolts, which is of course desirable in surface installations. However, if the mounting plate is to be used on a flush mounted panel board, the knockouts in the score lines 26 may be removed to provide large holes in the mounting plate for the bolts 21 and to provide considerable play between the mounting plate and its bolts, so necessary in flush mounted panelboards. By so constructing the mounting plate holes, the installing electrician may have the mounting plate holes formed at his will, and this is an important inventive feature of this application.

It is observed at the present time that if desired, the holes may be left large, as is now the common practice, and that suitable perforated washers may be utilized, to convert the holes from large ones for flush-mountings to small ones for surface installations. In other words, the knock-outs may be regarded as integral bushings and it is obvious that non-integral bushings may well be provided if desired.

The panel mounting plate supports the panel proper, comprising the insulating base 30, the bus bars 31, and the panel of circuit protective parts 32, (shown as breakers). Sheet metal legs 34, held in place on the mounting plate 20 by means of screws 35 passing through holes 36 of back flanges of these legs and threaded into tapped holes of the mounting plate, have their forward ends flanged as at 37, and tapped as at 38, and to these legs is secured, by means of screws 39, the panel housing plate 40.

To the housing plate 40, by means of screw bolts 42, which are fixedly journalled therein, is secured a housing frame 43 having an inwardly directed flange 44 into which the screws 42 are tapped. The frame 43 is laterally shiftable with respect to the plate 40 and takes up the space between the plate 40 and the door and trim or front plate 46 that is secured over the front surface 18 of the wall by means of suitable trim clamps 47. It is observed that the heads of screws 42 are accessible through the door opening of the plate 46, when the door 49 is opened.

It is also observed that before the housing frame 43 and the door and trim plate 46 are positioned, the main cables 50, which had been pulled through the conduit 16, are connected to the ends of the bus bars 31 by means of terminal lugs 51 and the side branch cables 53, which had been pulled through the conduits 17, are connected to the binding posts on the circuit protective devices 32, these cables having their terminal ends lying in the side gutters, between the panel and the side walls of the box 11. In order to cause the side branch cables 53 to clear the terminal lugs 51, in a manner that is best shown in Fig. 8, the legs 34 may be, and, as shown, are formed with cable guard portions 56 which represent mere continuations of these legs, continuing far enough to cause the side branch cables to clear the lugs 51 as indicated. It is of course understood that the legs 34 themselves partially or completely perform this function with or without the addition of the continuations or side guards 56 and that the proportioning of the panelboard parts may be such that the legs need not be provided with these continuations. Further, while the cable directing function of the legs and their continuations is shown in connection with main cable lugs 51, it is of course understood that this function may be utilized in the opposite end of the panel, in connection with the neutral strap, often provided but not here shown.

By reference to the drawings, and to the foregoing description of the panelboard and its method of installation, the importance of making the housing, which takes up the space between the panel and the front plate 46, in two relatively telescoping parts 40—43 can very well be understood. If this housing were made in one piece, as is the present practice in the manufacture of panel boards known to the applicant, then any final adjustment that is necessary in order to have the housing frame fit properly between the panel and the front plate can be effected only through the medium of the nuts 24 of the mounting plate adjustable bolts 21. Since the necessity for such a final adjustment arises only after the cables 50 and 53 are in place and connected, final adjustment becomes an annoying task, in part due to the fact that access to the nuts of the adjustable bolts of the mounting plate is interferred with by the presence of the cables 50 and 53, and also in part due to the fact that final adjustment, in a construction of such a character, involves a cut and try method and repeated adjusting operations. However, when the housing is made in two parts, as shown, final adjustment is a very simple matter because it can be effected through the medium of the adjustable housing screws 42 whose heads are accessible through the door opening 48. If it is found that the housing frame 43 projects too far forwardly or not far enough forwardly, the adjustable screws 42 can be manipulated, even after the plate 46 is permanently mounted, to move the housing frame 43 with respect to the panel, the housing plate 40, and the front plate 46, all without requiring access to the mounting bolts 21 and all without requiring movement of the panel and its associated parts.

Fig. 11 shows how coiled compression springs 57 may be placed on bolt sets 42, between nuts

58 thereon and the flange 44 of the housing frame 43 to bias the frame towards and against the front plate, and Fig. 12 shows how flat leaf springs 59, may be disposed between the housing plate 40 and the frame flange 44 to assist in rigidifying the structure, the springs being centrally riveted to the plate 40 and terminally guided by screws 59a tapped into the frame flange 44.

Figure 5:
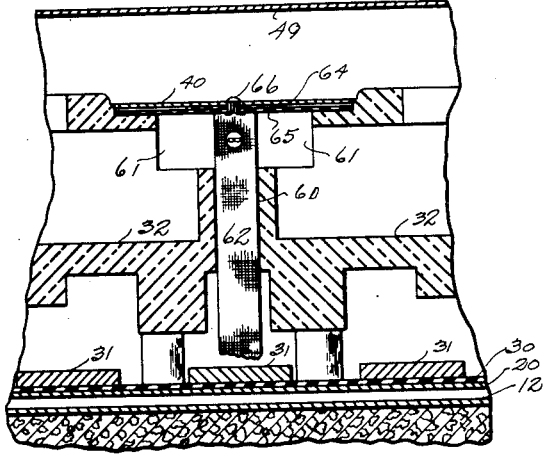
Fig. 5 is a greatly enlarged section of panel parts, and as if on line 5—5 of Fig. 1.
Figure 4:
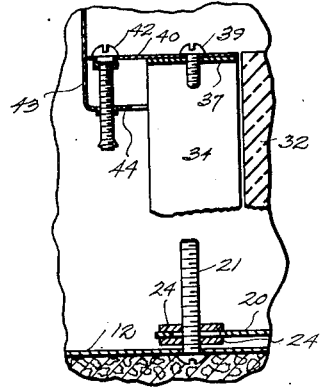
Fig. 4 is an enlarged detailed section as if on line 4—4 of Fig. 3.

In Fig. 5 there is shown as overlying the central one of the bus bars 31 an arc chute 60 into which open vents 61 from the interiors of the circuit protective devices or circuit breakers 32 forming the panel. The arc chute is closed at its end by suitably supported screens 62 of foraminous material and is closed at its forward surface, towards the front of the panel board by the metal housing plate 40. This housing plate is provided with windows 63 through which may be viewed indicia printed on a paper card 64, disposed in back of the metal housing plate 40 and held in place by a sheet 65 of formed insulating material, and by rivets 66 passed through the housing plate and the strip 64 and the insulating sheet 65. In certain constructions the sheet 65 will be omitted and the sheet 64 will be relied upon as providing an insulating barrier for the arc chute, in a manner that can well be seen, to prevent arcing to the metal housing plate 40.

Inasmuch as panels include various arrangements of circuit protective devices, for example, single pole breakers, double pole breakers, three pole breakers, etc., of different length it has heretofore not been considered possible to provide uniform and standardized parts for the circuit indicating means and it has heretofore been the practice to use individual sets of these means for individual cases. However I have worked out a scheme whereby the housing plate 40 is provided with a row of double windows, uniformly spaced and standardized so that regardless of what type of panel arrangement may be used with a particular housing plate, the housing plate need not be altered insofar as its windows are concerned. In the specific case illustrated, where the three pole circuit breakers are 1½ times as long, in a vertical direction in the panel board, as the double pole breakers and are 3 times as long in the same direction as the single pole breakers, the double windows of the row are uniformly spaced at a distance "$x$" equal to the length of a single pole breaker, which distance will consequently be one-half the length of a double pole breaker, and one-third the length of a three pole breaker. Behind the row of double windows may be disposed the strip or card 64 and the indicia thereon is arranged as shown, so that the card need merely be cut to length, and at the proper sections, in order to fit the particular panelboard with which it is to be used and need not be cut in small individually marked pieces.

For a window spacing "$x$", corresponding to a panel which may include S. P., D. P., or 3. P. breakers, the cards will be printed substantially as shown, with the printing spacings being uniform and at distances equal to $$\frac{x}{3}$$

or one-third of the spacing between the windows, it being observed that the fraction is the inverse of the largest number of poles in contemplation.

The stock cards are printed in strips and on both sides, and either side may be used, as the case may require. Further, the printing is such that the reverse face of one strip may be used as a continuation of the obverse face of another, in the event that the panel is too long for one strip.

The strip shown may be used, with the three different arrangements contemplated, substantially as follows: If the panel is to be made of S. P. breakers, the strip is moved to the position of Figs. 6 and 7a, so that the numbers will be visible through the windows, and the arrows will be concealed. If the panel is to be made up of D. P. breakers, the strip is moved up $$\frac{x}{3}$$

or one-third of a window spacing (Figs. 7b—8) and then, at the two windows for a breaker, there will be revealed a number and an arrow pointing up. If the panel is to be made up of 3. P. breakers, the strip is moved up $$\frac{2x}{3}$$

or two-thirds of a window spacing (Fig. 7c) and then, at the three windows for a breaker, there will be revealed a number, and an arrow pointing down to it, and an arrow pointing up to it.

In the event that a panel includes sections of S. P. breakers, sections of D. P. breakers, and sections of 3. P. breakers, the cards or strips may be cut in sections and used accordingly.

Therefore, it can be seen that one window arrangement on a housing plate 40 can be utilized as a standard arrangement, regardless of the possible or probable make up of the panel, and that a single card strip may be furnished which can be utilized with a panel as a circuit indicating means regardless of what type of breakers is used in the panel.

Now having described a panel of the invention and its associated parts, reference will be had to the appended claims which determine the scope of the invention.

I claim:

1. A panelboard having a panel and a front plate spaced therefrom, and housing means carried by the panel for bridging the space between them, the housing means being telescopically constructed so that its parts are relatively adjustable, with one of them being movable towards and from the plate.

2. A panelboard having a panel and a front plate spaced therefrom, and housing means independent of the plate and carried by the panel for bridging the space between them, the housing means being telescopically constructed so that its parts are relatively adjustable, with one of them being movable towards and from the plate.

3. A panelboard having a panel and a front plate spaced therefrom, and housing means carried by the panel for bridging the space between them, the housing means being telescopically constructed so that its parts are relatively adjustable, with one of them being movable towards and from the plate, and comprising a housing plate non-adjustably secured with respect to the panel, and a housing frame transverse to the housing plate and adjustably secured with respect thereto.

4. A panelboard having a panel and a front plate spaced therefrom, and a housing guard independent of the front plate and supported by the panel for bridging the space between them, the guard being adjustably secured with respect to the panel whereby the guard may be moved towards and away from the front plate to bridge the space between the panel and the front plate completely and without interference even though that space is less than the maximum permissible space.

5. A panelboard having a panel and a front plate spaced therefrom, and a housing guard independent of the front plate and supported by the panel for bridging the space between them, the guard being adjustably secured with respect to the panel whereby the guard may be moved towards and away from the front plate to bridge the space between the panel and the front plate completely and without interference even though that space is less than the maximum permissible space, the guard surrounding the panel with a clearance between the housing guard and the panel, and a housing plate substantially parallel to the front plate for covering the clearance between the panel and the housing guard.

6. A panelboard having a panel and a front plate spaced therefrom, and a housing guard independent of the front plate and supported by the panel for bridging the space between them, the guard being adjustably secured with respect to the panel whereby the guard may be moved towards and away from the front plate to bridge the space between the panel and the front plate completely and without interference even though that space is less than the maximum permissible space, the guard surrounding the panel with a clearance between the housing guard and the panel, and a housing plate substantially parallel to the front plate and carried by the panel for covering the clearance between the panel and the housing guard.

7. A panelboard including a cabinet, a panel therein and adjustably secured thereto, a front plate spaced therefrom, and housing means carried by the panel for bridging the space between the panel and the front plate, the housing means being telescopically constructed so that its parts are relatively adjustable, with one of them being movable towards and from the plate.

8. A panelboard including a cabinet, a panel therein and adjustably secured thereto, a front plate spaced therefrom, and housing means independent of the plate and carried by the panel for bridging the space between the panel and the front plate, the housing means being telescopically constructed so that its parts are relatively adjustable towards and from the plate.

9. A panelboard including a cabinet, a panel therein and adjustably secured thereto, a front plate spaced therefrom, and housing means carried by the panel for bridging the space between the panel and the front plate, the housing means being telescopically constructed so that its parts are relatively adjustable, with one of them being movable towards and from the plate, and comprising a housing plate non-adjustably secured with respect to the panel, and a housing frame transverse to the housing plate and adjustably secured with respect thereto.

10. A panelboard having a panel and a front plate spaced therefrom, and housing means carried by the panel for bridging the space between them, the housing means being telescopically constructed so that its parts are relatively adjustable, with one of them being movable towards and from the plate, the adjustment means being accessible through the front plate.

11. A panelboard having a panel and a front plate spaced therefrom, and housing means independent of the plate and carried by the panel for bridging the space between them, the housing means being telescopically constructed so that its parts are relatively adjustable, with one of them being movable towards and from the plate, the adjustment means being accessible through the front plate.

12. A panelboard having a panel and a front plate spaced therefrom, and housing means carried by the panel for bridging the space between them, the housing means being telescopically constructed so that its parts are relatively adjustable, with one of them being movable towards and from the plate, the adjustment means being accessible through a door opening in the front plate.

13. A panelboard having a panel and a front plate spaced therefrom, and housing means independent of the plate and carried by the panel for bridging the space between them, the housing means being telescopically constructed so that its parts are relatively adjustable, with one of them being movable towards and from the plate, the adjustment means being accessible through a door opening in the front plate.

14. A panelboard having a panel and a front plate spaced therefrom, and housing means carried by the panel for bridging the space between them, the housing means being telescopically constructed so that its parts are relatively adjustable, with one of them being movable towards and from the plate, the adjustment means being accessible through the front plate, and comprising screws whose axes extend in the direction of relative movement of the housing parts.

WILLIAM H. FRANK.